(12) United States Patent  (10) Patent No.: US 8,376,311 B2
Marshall et al.  (45) Date of Patent: Feb. 19, 2013

(54) VALVE ADJUSTMENT ASSEMBLY

(75) Inventors: Dori Marshall, Mesa, AZ (US); Larry Kelly, Chandler, AZ (US)

(73) Assignee: Honeywell International Inc., Morristown, NJ (US)

( * ) Notice: Subject to any disclaimer, the term of this patent is extended or adjusted under 35 U.S.C. 154(b) by 868 days.

(21) Appl. No.: 12/178,514

(22) Filed: Jul. 23, 2008

(65) Prior Publication Data

US 2010/0018587 A1    Jan. 28, 2010

(51) Int. Cl.
*F16K 31/12*    (2006.01)

(52) U.S. Cl. .......... 251/58; 251/278; 251/285; 251/305; 74/25

(58) Field of Classification Search .................. 251/58, 251/231, 305, 285, 288, 313, 337, 277, 278, 251/279, 274, 275, 276; 137/527; 74/25; 411/383, 384
See application file for complete search history.

(56) References Cited

U.S. PATENT DOCUMENTS

| | | | | |
|---|---|---|---|---|
| 3,737,142 A * | 6/1973 | Boswell et al. | ............... | 251/58 |
| 3,942,552 A * | 3/1976 | Logsdon | ............... | 137/517 |
| 3,985,151 A * | 10/1976 | Smith | ............... | 137/269 |
| 4,102,036 A * | 7/1978 | Salter | ............... | 29/525 |
| 4,261,546 A * | 4/1981 | Cory et al. | ............... | 251/58 |
| 4,435,100 A * | 3/1984 | Cox | ............... | 403/27 |
| 4,504,038 A * | 3/1985 | King | ............... | 251/58 |
| 4,777,980 A * | 10/1988 | Warhurst et al. | ......... | 137/625.69 |
| 4,846,441 A * | 7/1989 | Scobie et al. | ............... | 251/307 |
| 5,238,220 A | 8/1993 | Shell et al. | | |
| 5,269,343 A | 12/1993 | Trapp | | |
| 5,676,110 A | 10/1997 | Meneely | | |
| 6,076,799 A * | 6/2000 | Baumann | ............... | 251/62 |
| 6,105,927 A * | 8/2000 | Zelczer et al. | ............... | 251/58 |
| 7,296,595 B2 * | 11/2007 | Santinanavat et al. | ... | 137/614.19 |
| 2004/0244850 A1 * | 12/2004 | Browne et al. | ............. | 137/625.5 |
| 2008/0061260 A1 * | 3/2008 | O'Shea | ............... | 251/229 |

OTHER PUBLICATIONS

Tauris, M. J.; Tribological Investigation of a Spherical Bearing and Connecting Link of a Turbine Engine Bleed Valve, MANE 6960 Term Project, Dec. 10, 2007.

* cited by examiner

*Primary Examiner* — John Fox
*Assistant Examiner* — Seth Faulb
(74) *Attorney, Agent, or Firm* — Ingrassia Fisher & Lorenz, P.C.

(57) ABSTRACT

An adjustable valve assembly is disclosed. The valve assembly comprises a mounting portion and an adjustment assembly comprising an adjustable member threadably engaged with the mounting portion, the adjustable member adapted to change its position relative to the mounting portion when rotated and a clevis coupled to the adjustable member, wherein the position of the clevis relative to the mounting portion is adjustable by rotation of the adjustable member.

16 Claims, 6 Drawing Sheets

VALVE ADJUSTMENT ASSEMBLY

TECHNICAL FIELD

Embodiments of the subject matter described herein relate generally to controllable valves. More particularly, embodiments of the subject matter relate to remote adjustment of a valve position.

BACKGROUND

Valves are often used to regulate the flow of pressurized fluid through a conduit, sometimes resulting in an adjustment of pressure between the environments separated by the valve. Such valves often incorporate the use of a diaphragm mechanism to actuate the valve. Accordingly, a pressure differential can be used to adjust the position of the valve, controlling flow of the fluid through the valve.

A spring, such as a compression spring, is often used to assist in positioning and actuation of the valve. For example, a spring can be used to provide a load on one side of a diaphragm to equalize the forces on the diaphragm and establish a closed state of a valve. Thereafter, a pressure differential can cause the diaphragm to flex, thereby adjusting the position of the valve.

In certain circumstances, however, the positioning of the valve in its conduit may be offset from a fully closed or fully opened position, which is desirable for calibrating the valve's responses. Because the valve is already positioned or installed, however, adjusting the position of one or more components in the valve assembly to change the open or closed state of the valve to its desired state can result in a change in extension or compression of the spring. Consequently, the performance characteristics of the valve can be altered due to the unaccounted-for pre-loading of the spring load against the diaphragm.

BRIEF SUMMARY

An adjustable valve assembly is provided. The adjustable valve assembly comprises a mounting portion and an adjustment assembly comprising an adjustable member threadably engaged with the mounting portion, the adjustable member adapted to change its position relative to the mounting portion when rotated; and a clevis coupled to the adjustable member, wherein the position of the clevis relative to the mounting portion is adjustable by rotation of the adjustable member.

A valve assembly is also provided. The valve assembly comprises a valve portion adapted to be disposed in a plurality of positions, thereby selectively inhibiting a flow of fluid around it, a linkage assembly coupled to the valve portion and comprising a positioning arm extending along a longitudinal axis, the linkage assembly adapted to adjust the position of the valve portion through displacement of one end of the positioning arm along the longitudinal axis, a clevis coupled to the positioning arm and an adjustment assembly. The adjustment assembly comprises a rotatable member comprising a cavity and an engagement portion, the rotatable member adapted to move along the longitudinal axis in response to rotation of the engagement portion and a fastening member adapted to couple the clevis and the rotatable member, wherein movement of the rotatable member along the longitudinal axis adjusts the position of the valve portion.

A valve adjustment assembly is also provided. The valve adjustment assembly comprises a chamber comprising a mounting portion and containing a butterfly valve positioning arm, an adjustable member adapted to adjust its position relative to the mounting portion when rotated, the adjustable member threadedly engaged with the mounting portion, and a clevis coupled to the positioning arm and to the adjustable member, the clevis adapted to be positioned in response to rotation of the adjustable member, thereby adjusting the position of the positioning arm.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

Figure 1:
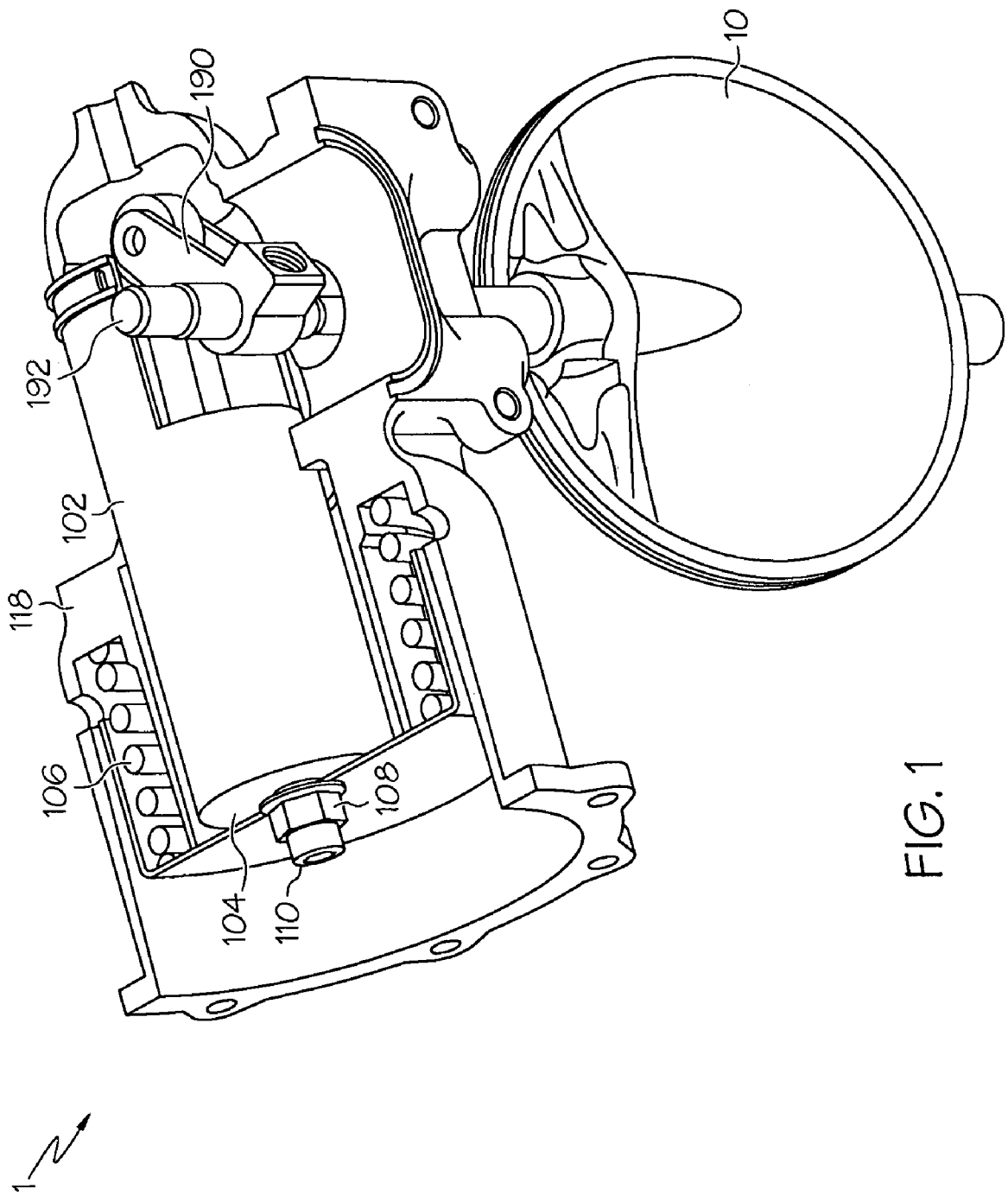
FIG. 1 is a perspective and partially-sectioned view of a butterfly valve assembly.

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

"Connected/Coupled"—The following description refers to elements or nodes or features being "connected" or "coupled" together. As used herein, unless expressly stated otherwise, "connected" means that one element/node/feature is directly joined to (or directly communicates with) another element/node/feature, and not necessarily mechanically. Likewise, unless expressly stated otherwise, "coupled" means that one element/node/feature is directly or indirectly joined to (or directly or indirectly communicates with) another element/node/feature in such a manner as to exert mutual influence between them, and not necessarily mechanically. Thus, although the illustrations of FIGS. 1-6 depict several exemplary arrangements of elements, additional intervening elements, devices, features, or components may be present in an embodiment of the depicted subject matter.

"Adjust"—Some elements, components, and/or features are described as being adjustable or adjusted. As used herein, unless expressly stated otherwise, "adjust" means to position, modify, alter, or dispose an element or component or portion thereof as suitable to the circumstance and embodiment. In certain cases, the element or component, or portion thereof, can remain in an unchanged position, state, and/or condition as a result of adjustment, if appropriate or desirable for the embodiment under the circumstances. In some cases, the element or component can be altered, changed, or modified to a new position, state, and/or condition as a result of adjustment, if appropriate or desired.

"Inhibit"—As used herein, inhibit is used to describe a reducing or minimizing effect. When a component or feature is described as inhibiting an action, motion, or condition it may completely prevent the result or outcome or future state completely. Additionally, "inhibit" can also refer to a reduction or lessening of the outcome, performance, and/or effect which might otherwise occur. Accordingly, when a component, element, or feature is referred to as inhibiting a result or state, it need not completely prevent or eliminate the result or state.

In addition, certain terminology may also be used in the following description for the purpose of reference only, and thus are not intended to be limiting. For example, terms such as "upper", "lower", "above", and "below" refer to directions in the drawings to which reference is made. Terms such as "front", "back", "rear", "side", "adjacent", "outboard", and "inboard" describe the orientation and/or location of portions of the component within a consistent but arbitrary frame of reference which is made clear by reference to the text and the associated drawings describing the component under discussion. Such terminology may include the words specifically mentioned above, derivatives thereof, and words of similar import. Similarly, the terms "first", "second" and other such numerical terms referring to structures do not imply a sequence or order unless clearly indicated by the context.

Figure 2:
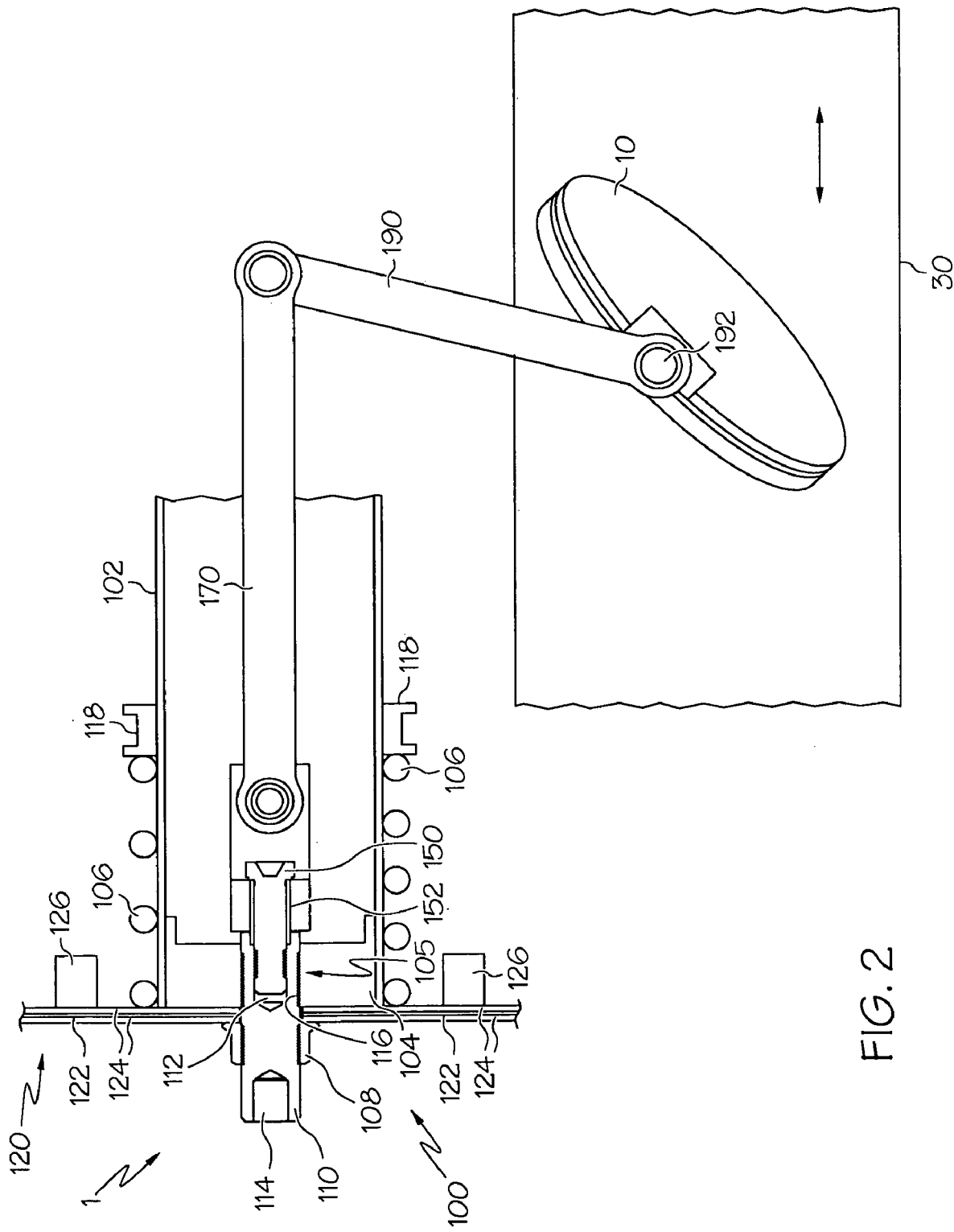
FIG. 2 is a cross-sectional view of the butterfly valve assembly of FIG. 1 in a first state.
Figure 3:
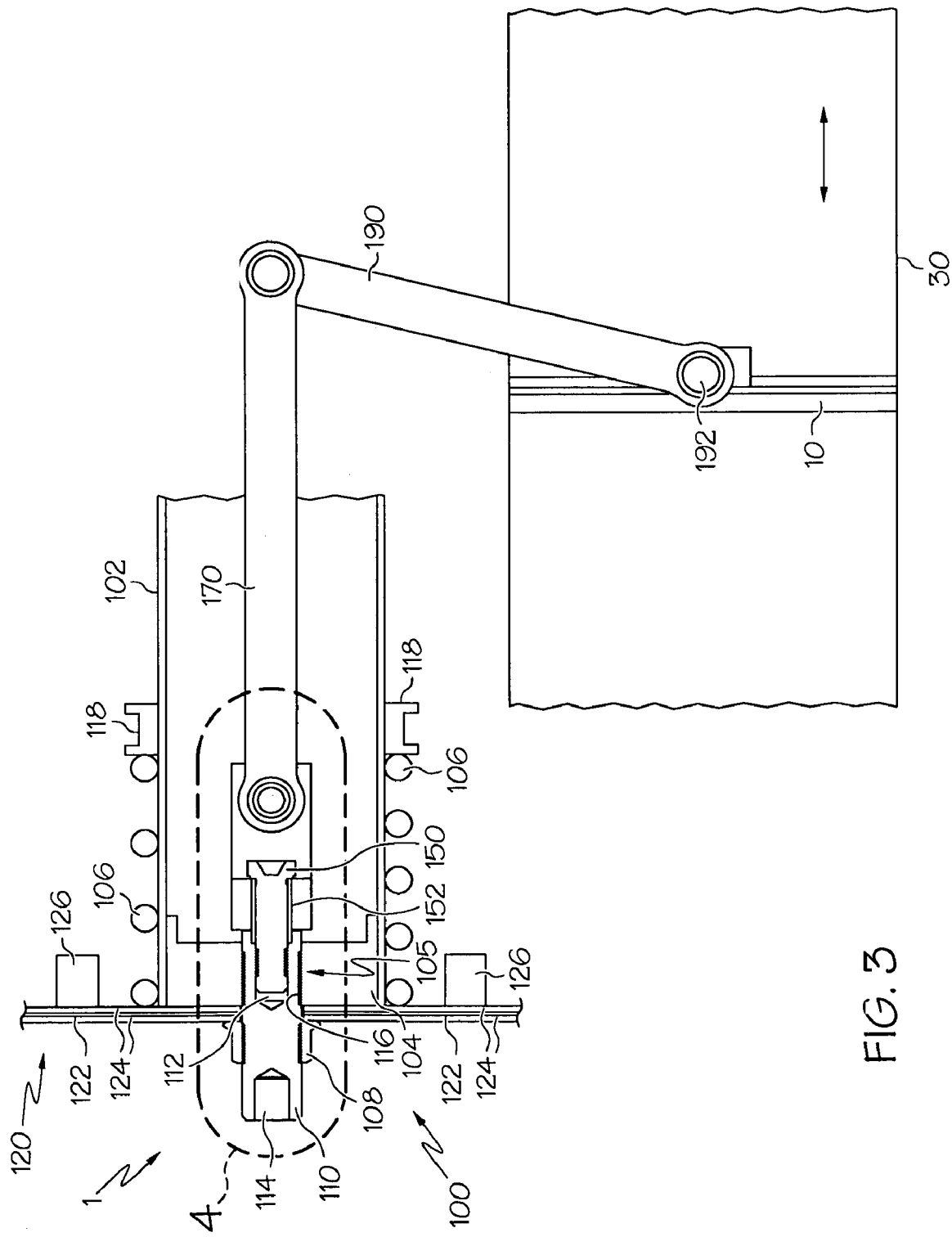
FIG. 3 is a cross-sectional view of the butterfly valve assembly of FIG. 1 in a second state.
Figure 4:
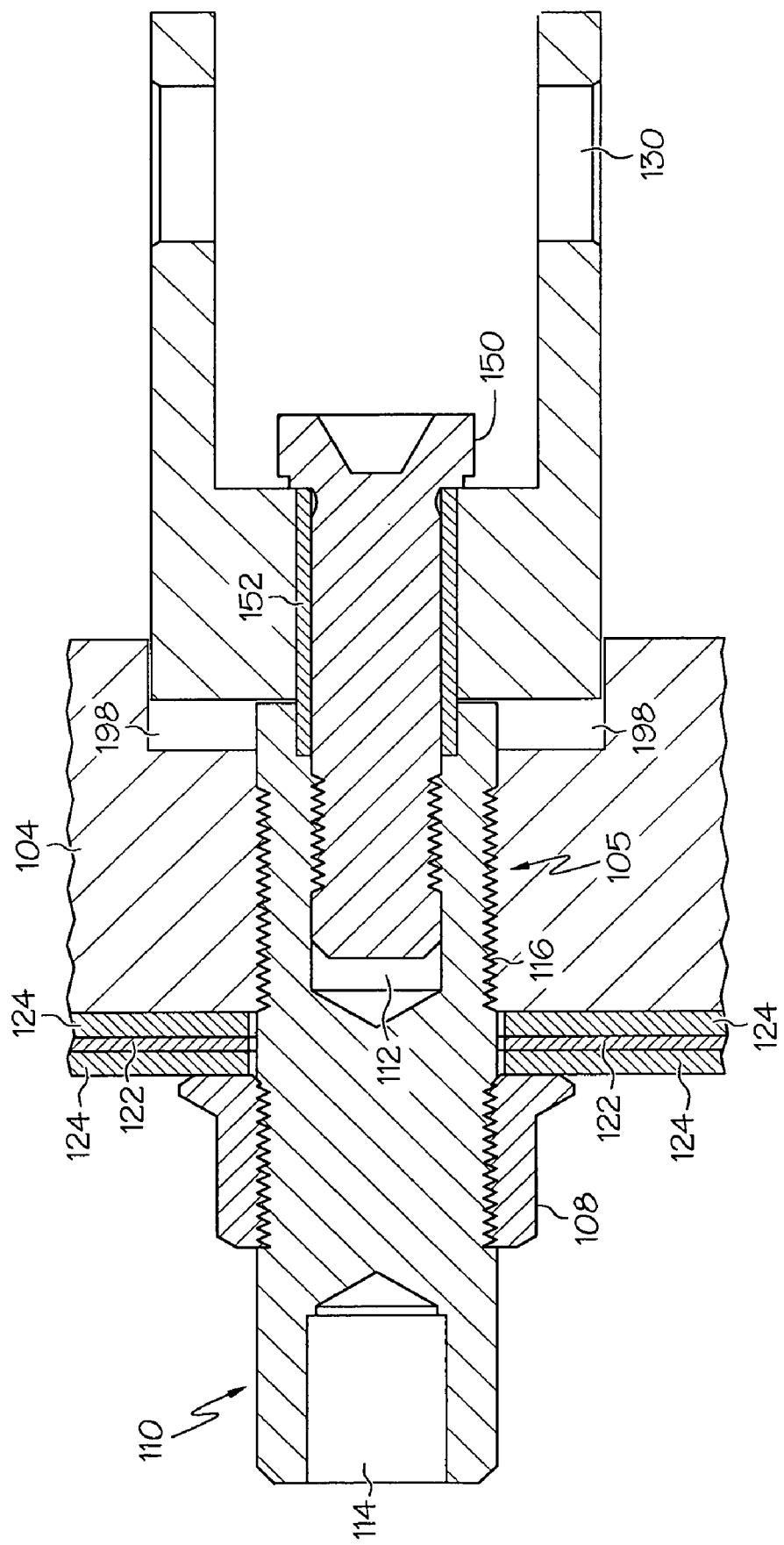
FIG. 4 is a detailed view an adjustment assembly of the butterfly valve assembly of FIG. 1.

FIGS. 1-3 illustrate an embodiment of an adjustable butterfly valve assembly 1. FIG. 4 illustrates a detailed view of the embodiment of some of the components of FIGS. 1-3. As shown, the adjustable butterfly valve assembly 1 can comprise a butterfly plate 10 disposed in a flow conduit 30. The butterfly plate 10 can be coupled to an adjustment assembly 100 disposed in a guide tube 102 containing a mounting portion 104. The adjustment assembly 100 can comprise an adjustable member 110 threadedly engaged with the mounting portion 104, a clevis 130, and a fastening member 150. The clevis 130 can be coupled to the butterfly plate 10 by a positioning arm 170 and a coupling arm 190. The clevis can also be coupled to the adjustable member 110 by the fastening member 150. Accordingly, changing the position of the adjustable member 110, such as by rotation of a threaded member, can result in a change of position of the butterfly plate 10.

The mounting portion 104 to which the adjustable member 110 is threadedly engaged can move inside the guide tube 102 in a piston-like manner. As shown in the illustrated embodiment, the mounting portion 104 can be coupled to a diaphragm assembly 120, resulting in movement of the mounting portion 104 during flexure of the diaphragm assembly 120. The diaphragm assembly 120 can be constrained by a diaphragm stop 126 and receive a force from a positioning spring 106, adjusting its position and responsiveness to pressure differences. A locking member 108 can secure the adjustable member 110 to the diaphragm assembly 120. Thus, once the position of the mounting portion 104 and diaphragm assembly 120 and load state of the spring 106 are desirably set, the adjustable member 110 advantageously can be rotated to adjust the butterfly plate 10 to a desired position. Once so positioned, the locking member 108 can inhibit further rotation. Thus, the position and subsequent operation of the butterfly plate 10 can be calibrated independent of the load state of the spring 106 and position of the mounting portion 104.

The butterfly plate 10 is preferably a metal valve portion disposed in a conduit or chamber, such as the flow conduit 30, containing a fluid stream. The plate 10 can be positioned at any of a range of angles adjusting the amount of occlusion of the conduit 30 by the plate 10. FIG. 2 illustrates the butterfly plate 10 disposed in an intermediary position. When the plate 10 is positioned directly traverse to the fluid flow and completely occluding the interior of the conduit 30, however, it can inhibit fluid flow through the conduit 30. Accordingly, the butterfly plate 10 preferably has a cross-section nearly identical to the shape of the interior of the conduit 30. The plate 10 can be of sufficient thickness to withstand the fluid pressure generated by obstructing, and thereby inhibiting, fluid flow through the conduit 30. FIG. 3 illustrates the butterfly plate 10 disposed in such a maximally-occluding, or closed, position.

When the plate 10 is positioned with its surfaces parallel to the direction of fluid flow, it is in a maximally-open position. In such a position, the butterfly plate 10 inhibits the least amount of fluid flow through the conduit 30. When positioned between the maximally-open position and complete occlusion of the flow conduit 30, the butterfly plate 10 can selectively adjust the rate of fluid flowing past it. Preferably, the butterfly plate 10 can be selectively placed in any of the range of positions between the maximally-open and closed positions, permitting control over the rate of fluid flow.

The position of the butterfly plate 10 can be adjusted by the coupling arm 190. Preferably, the coupling arm 190 is coupled to the butterfly plate 10 with a coupling pin 192 or bolt. The coupling arm 190 is preferably coupled to the butterfly plate 10 so as to induce rotation of the butterfly plate 10 in response to a change of position of the coupling arm 190. In some embodiments, the coupling arm 190 can engage the butterfly plate 10 at a location offset from the center of the plate 10 by another arm component, if desired. In other embodiments, the coupling arm 190 can be rigidly coupled to the butterfly plate 10 such that movement of the coupling arm 190 directly rotates the butterfly plate 10.

The coupling pin 192 or other fastening mechanism can extend through the conduit 30 wall, preferably at a location with a sealing element, such as an o-ring or other elastomeric member inhibiting fluid from leaking out of the conduit 30. Accordingly, the butterfly plate 10 can be adjusted through positioning of the coupling arm 190 outside the conduit 30. In the illustrated embodiment, the coupling arm 190 extends toward the center of the guide tube 102, or other chamber, conduit, or pipe. Although the two chambers—the guide tube 102 and conduit 30—have relative positions as shown in the illustrated embodiment, other positions are possible, as appropriate to the embodiment. Thus, the guide tube 102 can be located above, below, behind, to the side of, or otherwise proximate the conduit 30, as useful in the embodiment.

The coupling arm 190 can be coupled to the positioning arm 170 through any mechanism appropriate to the embodiment. As shown, a pin or bolt can couple the two components, though other devices or coupling methods can be used. In certain embodiments, the coupling arm 190 can have a limited range of motion, such as an arc, as constrained by its connection to the butterfly plate 10. Accordingly, while the positioning arm 170 moves substantially along a longitudinal axis extending down its length, and the length of the guide tube 102, the end coupled to the coupling arm 190 can travel in an arc-shaped path, including movement traverse to the longitudinal axis. Thus the couplings between the positioning arm 170 and the coupling arm 190 and the clevis 130 preferably permit some rotation.

Adjusting the position of the clevis 130, therefore, adjusts the position of the butterfly plate 10. The clevis 130 can be embodied as a yoke or forked component surrounding one end of the positioning arm 170 with a pin or bolt extending through holes in the clevis 130 to secure the positioning arm 170. Although the coupling between the clevis 130 and positioning arm 170 can be free to rotate, translational movement of the clevis 130, either along the longitudinal axis of the positioning arm 170 or traverse to it, can cause a change in position of the end of the positioning arm 170.

The clevis 130 can be coupled or secured to an adjustment or adjustable member 110 by a fastening member 150. As shown, the fastening member 150 can extend through a spacing member 152 to engage the adjustable member 110. In some embodiments, the spacing member 152 can be a bushing or sleeve adapted to facilitate rotation of the clevis 130 relative to the fastening member 150 or adjustable member 110.

Several components, such as the coupling pin 192, coupling arm 190, and positioning arm 170 can collectively be referred to as a linkage assembly. A linkage assembly can be one or more components which cooperate to adjust the position of a valve member, such as the butterfly plate 10, as a result of movement or adjustment of the position of one of the components, such as the positioning arm 170.

The adjustable member 110, which can be embodied as a rotatable member, can have a cavity 112 adapted to receive the fastening member 150. In some embodiments, the cavity 112 can have a threaded surface as shown, allowing for threaded engagement of the fastening member 150. Accordingly, in some embodiments, the fastening member 150 can be a bolt or partially-threaded rod. Preferably, the fastening member 150 has a smooth portion positioned within the spacing member 152. Other engagement mechanisms and devices besides a threaded engagement can secure the fastening member 150 and the adjustable member 110, including interference fits, adhesives, such as a glue or epoxy, or any other appropriate to the embodiment.

The adjustable member 110 can have an engagement portion 114. The engagement portion 114 can be rigidly and integrally formed with the main body of the adjustable member 110. The engagement portion 114 can also be sized and shaped to receive a standard rotation tool, including such screwdrivers as Phillips-head, hex-head, TORX™ head, and so on. Thus, the engagement portion 114 can receive an instrument for rotating the adjustable member 110, permitting rotation with simple manipulation.

The adjustable member 110 can also have a first threaded portion 116 adapted to engage a threaded surface 105 of the mounting portion 104. Accordingly, the adjustable member 110 can have its position relative to the mounting portion 104 and along the longitudinal axis of the positioning arm 170 and guide tube 102 adjusted by rotation of the adjustable member 110. Because the adjustable member 110 is coupled to the clevis, rotation of the adjustable member 110 to adjust its position can also adjust the position of the butterfly plate 10, thereby controlling fluid flow through the conduit 30.

In some embodiments, a locking member 108 can engage the adjustable member 110, inhibiting its rotation. In the illustrated embodiment, the locking member 108 is a nut having an interior threaded surface engaged with a second threaded portion 109 of the adjustable member 110 and disposed against the diaphragm assembly 120, thereby inhibiting movement of the adjustable member 110 toward the diaphragm assembly 120. In certain embodiments, the locking member 108 can be coupled to the adjustable member 110 and/or diaphragm assembly 120 through different means, such as adhesives, interference fits, and so on.

The guide tube 102 is preferably stationary, relative to the components disposed in and around it. The tube 102 can constrain movement of the mounting portion 104 to a longitudinal axis of the tube 102, corresponding to a longitudinal axis of the positioning arm 170. The mounting portion 104 can be coupled to the diaphragm assembly 120 by engagement of the locking member 108. With reference to the illustrated embodiment, the diaphragm assembly 120 can inhibit movement of the mounting portion 104 along the guide tube 102 towards the right by resting against a diaphragm stop 126, as described in greater detail below.

The mounting portion 104 can also be shaped to receive a portion of the clevis 130, as shown. Preferably, the end portion of the mounting portion 104 which receives the clevis 130 can have an indentation, groove, or channel appropriately sized and shaped. In certain embodiments, the clevis 130 can have a quadrilateral-shaped end, preferably rectangular, though a square or other quadrilateral can also be used. In some embodiments, the clevis 130 need not have a quadrilateral shape, but instead one which has one or two straight sides. Thus, an extended oval shape having two parallel straight sides and two rounded sides can also be used.

The mounting portion 104 can have a corresponding indentation with a shape adapted to receive the clevis 130. In certain embodiments, such as the illustrated embodiment, the indentation in the mounting portion 104 does not have a shape matching the end of the clevis 130, but instead one adapted to contact the clevis 130 along at least one of its quadrilateral sides. Thus, preferably, once disposed in the indentation, the clevis 130 is constrained from rotating, while free to move laterally relative to the mounting portion 104. Accordingly, any of a number of regular or irregular geometric shapes can be used for the mating portions of the mounting portion 104 and the clevis 130. Although a substantially linear surface, such as one side of a quadrilateral or other shape, can be used to induce contact, thereby inhibiting rotation, appropriately shaped curved surfaces can also be used.

The diaphragm assembly 120 can surround at least partially, and preferably completely, the adjustable member 110. The diaphragm assembly 120 preferably contacts the mounting portion 104 on one side and the locking member 108 on the other. The diaphragm assembly 120 and adjustable member 110 therefore move together when the locking member 108 is engaged.

Accordingly, the position of mounting portion 104 can be adjusted by flexure of the diaphragm assembly 120, resulting in motion of the mounting portion 104 coupled to the positioning arm 170 by the adjustable member 110, fastening member 150, and clevis 130. The positioning arm 170, in turn, is coupled to the butterfly plate 10 by the coupling arm 190. Thus, the position of the butterfly plate 10 can be adjusted by flexure of the diaphragm assembly 120.

The diaphragm assembly 120 can be composed of a single component or multiple components. In the illustrated embodiment, the diaphragm assembly 120 comprises a flexible layer 122 between two inflexible layers 124. The flexible layer 122 can also be a diaphragm in its own right, or cooperate with other layers to compose a diaphragm. Fewer inflexible layers can be used in certain embodiments, where the flexible layer 122 has an appropriate stiffness. In some embodiments, a different composition of the diaphragm assembly 120 is used. Preferably, the diaphragm assembly 120, being coupled to the adjustable member 110, changes the position of the adjustable member 110 in response to a pressure difference on either side of the diaphragm. In the illustrated embodiment, the diaphragm assembly 120 has a resting position against a diaphragm stop 126 across the guide tube 102.

A positioning spring 106, such as a helical compression spring, can impart an outward force, pushing the diaphragm assembly 120 away from the diaphragm stop 126. The positioning spring 106 can surround the guide tube 102 and rest against a spring stop 118. In certain embodiments, the spring stop 118 can be a flange extending circumferentially around the guide tube 102. One embodiment of such a flange can be a portion of a surrounding housing, as illustrated in FIG. 1.

The force imparted to the diaphragm assembly 120, and consequently the adjustable member 110, by the positioning spring 106 can vary based on the characteristics of the spring 106. For example, a stiffer spring can impart a greater force than a more flexible spring when both are identically deflected of from an unloaded position. When used in the valve assembly 1, the force from the spring 106 can depend on the position of the diaphragm stop 126, the spring stop 118, the position of contact with the diaphragm assembly 120, and the stiffness of the spring. Reciprocally, the distance of deflection of the spring 106 as caused by the position of the diaphragm assembly 120 can depend on the pressure difference across the diaphragm layers 122, 124 and the position of the butterfly plate 10, which affects the position of the adjustable member 110.

During use, the diaphragm assembly 120 is preferably in a known and controlled state. Because a pressure difference on either side of the diaphragm assembly 120 can result in flexure of the flexible layer 122, and consequent movement of the adjustable member 110, resulting in a change of position of the butterfly plate 10, it is desirable to accurately calibrate the forces experienced by the diaphragm assembly 120. Without an adjustment assembly 100, variations in manufacture or installation can result in undesirable force on the diaphragm assembly 120. For example, if the valve assembly 1 is assembled in situ, and subsequently the butterfly plate 10 is rotated to a desired position, the resulting movement of the positioning arm 170 can place the adjustable member 110 in one of three states.

First, the adjustable member 110 can be positioned in the neutral position shown in the illustrated embodiment, where the spring 106 is not experiencing a compressive force from the diaphragm assembly 120. This is the desired position, where a change in position of the butterfly plate 10 resulting from pressure differences across the diaphragm assembly 120 can be predicted. Such a prediction can include the effect of force from the spring 106.

Second, the adjustable member 110 can be pulled toward the right of the neutral position shown in the illustrated embodiment by a force exerted by the positioning arm 170. As a result, the diaphragm assembly 120 will be deflected inward from the end of the guide tube 102, compressing the spring 106. As a result, when a relatively high pressure present on the right side of the diaphragm assembly 120 would create a pressure difference sufficient to change the position of the adjustable member 110 from a neutral position, it can be insufficient to overcome the force from the positioning arm 170. In the third case, the adjustable member 110 can be pushed to the left of the neutral position, with a similar, but opposite result. Consequently, it can be more difficult to predict the response of the valve assembly 1 to pressure differences when the adjustable member 110 is offset from the illustrated neutral position.

Because the adjustable member 110 can adjust the position of the butterfly plate 10 independent of flexure of the diaphragm assembly 120 or deflection of the spring 106, the valve assembly 1 can be disposed in a neutral condition, despite irregularities in manufacture, assembly, and/or installation. Instead of positioning the valve assembly 1 and subsequently adjusting the butterfly plate 10 to a desired position, with possible resulting forces on the adjustment assembly 100, the valve assembly 1 can be positioned such that it is in a desired, unloaded state. Subsequently, the adjustable member 110 can be rotated, such as with a screwdriver inserted into the engagement portion 114. When rotated, the adjustable member 110 can move through and/or along the mounting portion 104 through engagement of the threaded surface 105 by the first threaded portion 116. Although the fastening member 150 can rotate with the adjustable member 110, the indentation in which the clevis 130 rests, as described above, will inhibit rotation of the clevis 130.

Accordingly, the butterfly plate 10 can be positioned independently of the position of the adjustment assembly 100. Thus, the butterfly plate 10 can be positioned as desired after the adjustment assembly 100 is placed in a neutral position. As a result, calibration of the valve assembly 1 through positioning of the butterfly plate 10 advantageously occurs independent of position changes of, and resulting load from, the spring 106 and diaphragm assembly 120. The locking member 108 can be subsequently engaged to prevent inadvertent additional movement of the adjustable member 110.

Figure 5:
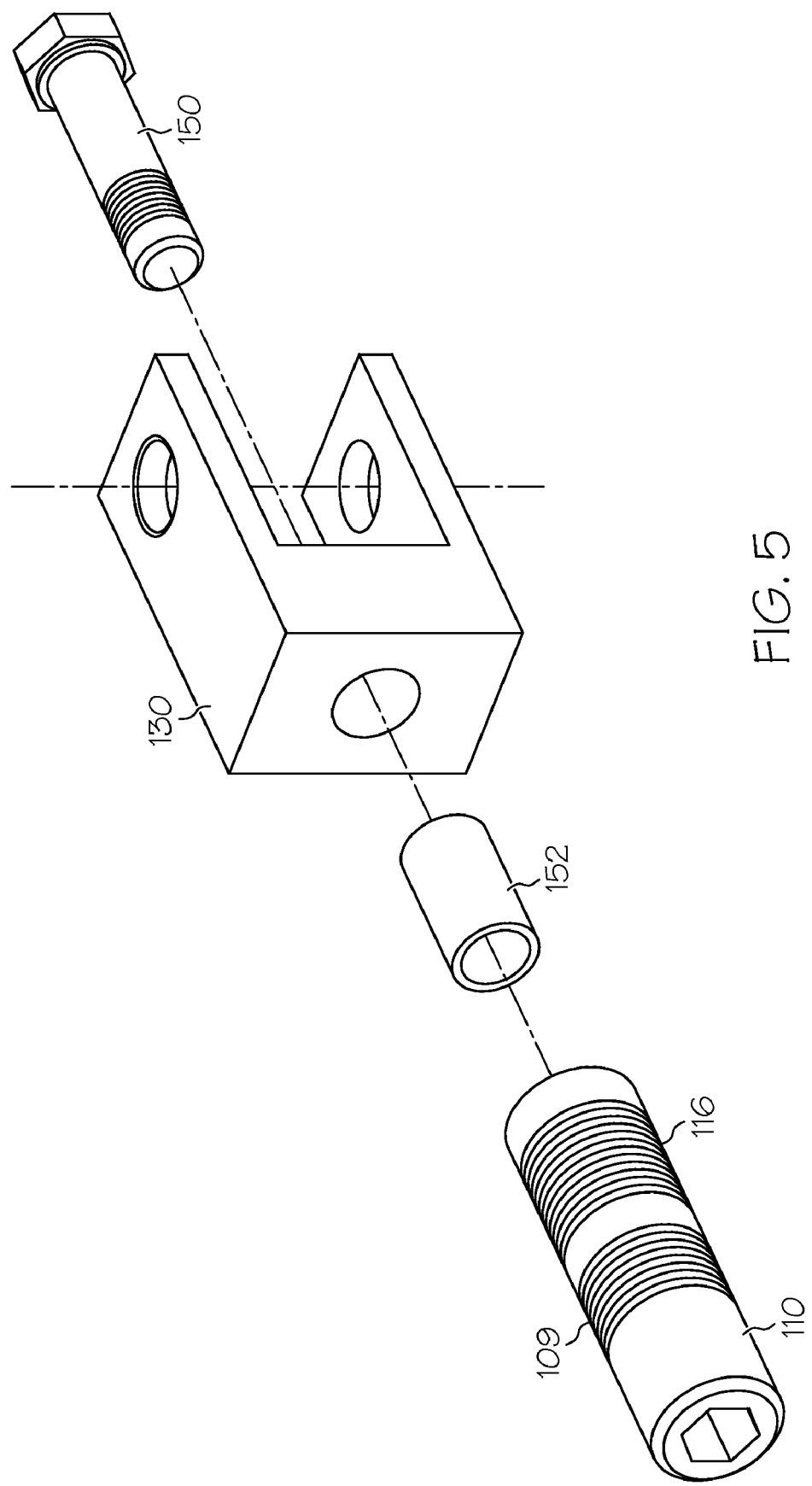
FIG. 5 is an exploded view of the adjustment assembly of FIG. 4.

FIG. 5 illustrates an exploded view of the components of FIG. 4 for clarity. As can be seen, the clevis 130 preferably is disposed in an indentation 194 of the mounting portion 104. Because FIG. 4 illustrates a cross-sectional view of the components, the contact between the clevis 130 and indentation 194 appears to be along two parallel straight surfaces 196. Accordingly, the clevis 130 preferably has at least one flat surface along the portion disposed in the indentation 194.

Figure 6:
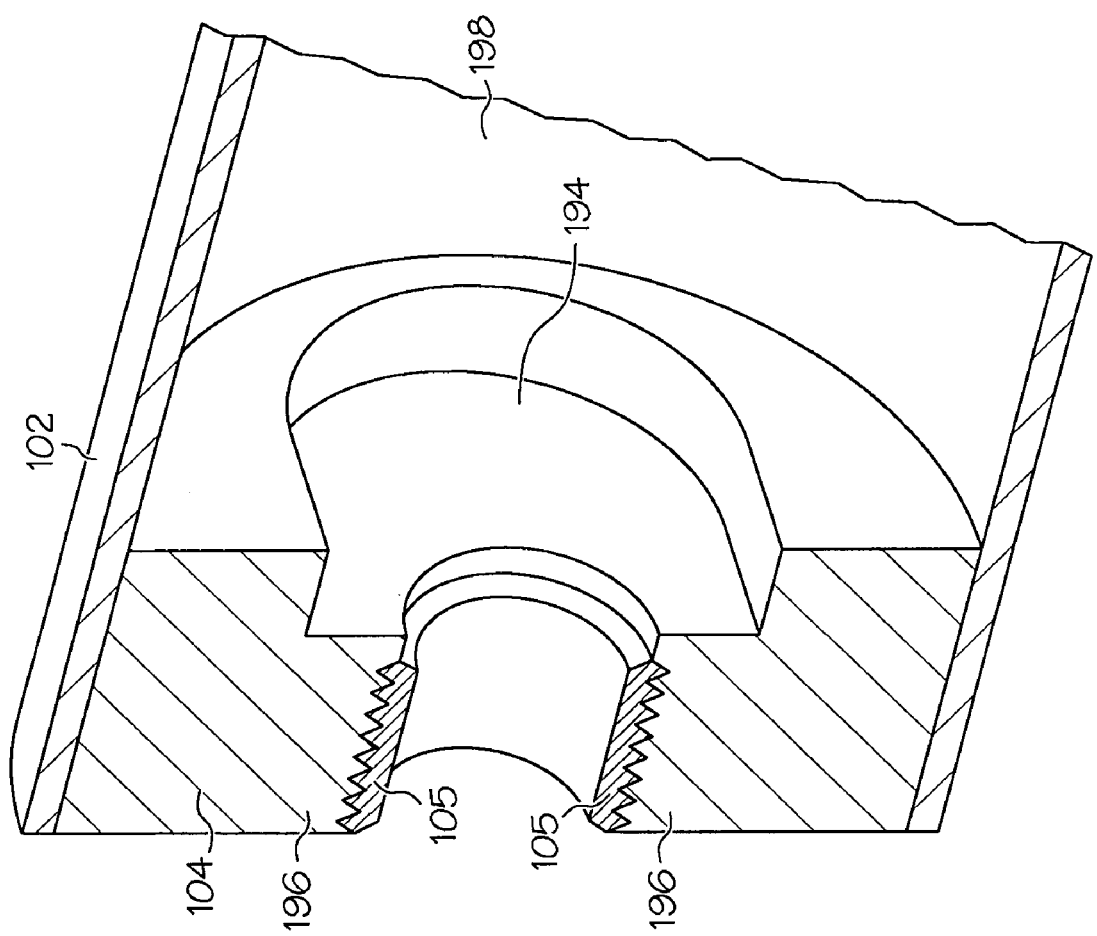
FIG. 6 is a detailed view of an embodiment of a mounting portion of the butterfly valve assembly of FIG. 1.

FIG. 6 illustrates an embodiment of the indentation 194 of the mounting portion 104. Although the straight surfaces 196 shown in FIG. 4 inhibit rotation of the clevis 130 relative to the mounting portion 104 when disposed in the indentation 194, the side surfaces of the indentation 194 can have non-rectilinear components, such as the curved portion 198. Other shapes, as described above, can also be used.

While a butterfly valve is illustrated in the context of this invention, other valve types can be used as well. Preferably, axial positioning of a component, such as the positioning arm 170, is used to adjust the position of the valve opening, as with the butterfly plate 10 in the illustrated embodiment. In such valves, the valve adjustment assembly can be embodied as shown. Other types of valve adjustment mechanisms can also be used with the valve adjustment assembly, such as rotational positioning, as with a screw, bolt, or other threaded member, and the like, with different configurations of the valve adjustment assembly to couple with the appropriate positioning member.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. An adjustable valve assembly comprising:
a mounting portion having a threaded surface; and
an adjustment assembly comprising:
an adjustable member having a first threaded portion threadably engaging the threaded surface of the mounting portion, the adjustable member adapted to change its position relative to the mounting portion when rotated;
a clevis coupled to the adjustable member, wherein the position of the clevis relative to the mounting portion is adjustable by rotation of the adjustable member; and
a spacing member and a fastening member, the spacing member comprising a bushing at least partially surrounding the fastening member and disposed between the fastening member and the clevis, the spacing member adapted to facilitate rotation of the clevis relative to the fastening member.

2. The adjustable valve assembly of claim 1, wherein the mounting portion comprises an indentation at least partially surrounding the adjustable member, the indentation having a flat surface and adapted to receive a portion of the clevis.

3. The adjustable valve assembly of claim 2, wherein the clevis comprises a rotation-inhibiting portion having a quadrilateral-shaped cross-section, the rotation-inhibiting portion disposed in the indentation of the mounting portion and positioned to contact the flat surface, thereby inhibiting rotation of the clevis relative to the mounting portion.

4. The adjustable valve assembly of claim 1, further comprising a locking member adapted to threadedly engage the adjustable member and contact the mounting portion, thereby inhibiting motion of the adjustable member.

5. The adjustable valve assembly of claim 4, wherein the locking member comprises a nut.

6. The adjustable valve assembly of claim 1, wherein the adjustable member comprises a cavity having a threaded surface.

7. The adjustable valve assembly of claim 6, wherein the fastening member at least partially extends into the cavity and threadedly engages with the adjustable member, the fastening member adapted to couple the clevis to the adjustable member.

8. A valve assembly comprising:
a valve portion adapted to be disposed in a plurality of positions, thereby selectively inhibiting a flow of fluid around it;
a linkage assembly coupled to the valve portion and comprising a positioning arm extending along a longitudinal axis, the linkage assembly adapted to adjust the position of the valve portion through displacement of one end of the positioning arm along the longitudinal axis;
a clevis coupled to the positioning arm; and
an adjustment assembly comprising:
a rotatable member comprising a longitudinal cavity and an engagement portion, the rotatable member adapted to move along the longitudinal axis in response to rotation of the engagement portion;
a fastening member adapted to be received in the longitudinal cavity and to couple the clevis and the rotatable member, wherein movement of the rotatable member along the longitudinal axis adjusts the position of the valve portion; and
a spacing member comprising a bushing at least partially surrounding the fastening member, the spacing member adapted to facilitate rotation of the clevis relative to the fastening member or the rotatable member.

9. The valve assembly of claim 8, further comprising a locking member adapted to couple with the rotatable member, thereby inhibiting rotation of the engagement portion.

10. The valve assembly of claim 8, further comprising a diaphragm portion comprising:
a diaphragm at least partially surrounding the rotatable member and coupled to the rotatable member, the diaphragm adapted to adjust the position of the rotatable member along the longitudinal axis; and
a positioning spring at least partially surrounding the adjustment assembly and adapted to adjust the position of the diaphragm along the longitudinal axis.

11. A valve adjustment assembly comprising:
a chamber comprising a mounting portion having a threaded surface and containing a butterfly valve positioning arm;
an adjustable member adapted to adjust its position relative to the mounting portion when rotated, the adjustable member having a first threaded portion threadably engaging the threaded surface of the mounting portion; and
a clevis coupled to the positioning arm and to the adjustable member, the clevis adapted to be positioned in response to rotation of the adjustable member, thereby adjusting the position of the positioning arm.

12. The valve adjustment assembly of claim 11, wherein the mounting portion comprises an indentation having a flat portion adapted to receive a portion of the clevis.

13. The valve adjustment assembly of claim 12, wherein the clevis comprises a flat surface and extends at least partially into the indentation, the flat surface positioned to contact the flat portion of the indentation, thereby inhibiting rotation of the clevis relative to the mounting portion.

14. The valve adjustment assembly of claim 11, further comprising a locking portion adapted to inhibit rotation of the adjustable member.

15. The valve adjustment assembly of claim 11, wherein the clevis is coupled to the adjustable member by a fastening member, the clevis at least partially surrounding the fastening member.

16. The valve adjustment assembly of claim 15, further comprising a spacing member disposed between the fastening member and the clevis, the spacing member adapted to facilitate rotation of the clevis relative to the fastening member.

* * * * *